United States Patent
Dunko et al.

(10) Patent No.: US 6,553,236 B1
(45) Date of Patent: Apr. 22, 2003

(54) ON DEMAND LOCATION FUNCTION FOR MOBILE TERMINAL

(75) Inventors: Gregory Dunko, Cary, NC (US); Jon Lohr, Raleigh, NC (US); Javor Kolev, Apex, NC (US); Edward V. Jolley, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/536,966

(22) Filed: Mar. 28, 2000

(51) Int. Cl.$^7$ ................................................. H04Q 7/20
(52) U.S. Cl. ..................... 455/456; 455/457; 455/518; 455/550
(58) Field of Search .................. 455/456, 457, 455/404, 550, 414, 518, 519

(56) References Cited

U.S. PATENT DOCUMENTS

| | | |
|---|---|---|
| 5,461,390 A | 10/1995 | Hoshen |
| 5,479,482 A | 12/1995 | Grimes |
| 5,485,163 A | 1/1996 | Singer et al. |
| 5,625,668 A * | 4/1997 | Loomis et al. ............... 379/58 |
| 6,115,611 A | 9/2000 | Kimoto et al. |
| 6,295,454 B1 * | 9/2001 | Havinis et al. ............. 455/456 |
| 6,330,454 B1 * | 12/2001 | Verdonk .................... 455/456 |

FOREIGN PATENT DOCUMENTS

| | | |
|---|---|---|
| DE | 19831086 A1 | 1/2000 |
| JP | 10013961 | 1/1998 |
| WO | WO98/00988 | 1/1998 |
| WO | WO99/19742 | 4/1999 |
| WO | WO99/41723 | 8/1999 |
| WO | WO99/55114 | 10/1999 |

OTHER PUBLICATIONS

Prakash, Ravi; Baldoni, Roberto; "Architecture for Group Communication in Mobile Systems," XP–002182298, 8 total pages.

* cited by examiner

Primary Examiner—Daniel Hunter
Assistant Examiner—Lana Le
(74) Attorney, Agent, or Firm—Coats & Bennett, P.L.L.C.

(57) ABSTRACT

A wireless communications system supports affinity groups of like minded individuals who wish to know locations of other members of the affinity group. The system supports members of the affinity group querying, through a mobile terminal for the location of a remote member of the affinity group as sensed by the remote member's mobile terminal. Rather than report raw geocoordinates, location place-name descriptions are defined by the members of the affinity group and shared amongst one another. Additionally, situational alarms may be generated in the event certain user defined criteria are met, such as two remote members of the affinity group being in close proximity to one another.

9 Claims, 5 Drawing Sheets

ON DEMAND LOCATION FUNCTION FOR MOBILE TERMINAL

BACKGROUND OF THE INVENTION

The present invention is directed to a mobile terminal, such as a cellular phone, equipped with affinity group messaging, and more particularly to a mobile terminal equipped with the ability to locate members of the affinity group on demand.

One reason for the popularity of portable, wireless communication devices, such as cellular phones, is that they free people from tethers to fixed communication networks. A user can roam freely in the network, yet remain in touch with others. Thus, mobile communication devices provide a means by which people can remain in contact with whomever they want, wherever they happen to be. This is especially true among groups of individuals who share a common interest or affiliation (e.g., families, co-workers, those who share a common avocation or interest, such as tennis or music, and members of a club). Such groups shall be referred to herein as an affinity group.

Several existing technologies facilitate interaction among the members of an affinity group: Internet "chat rooms," electronic mail (e-mail), advanced personal information management (PIM) applications such as Microsoft® Outlook™, paging services, and advanced messaging services employing contact servers. Some Internet chat software, for example, AOL® Instant Messenger™, ICQ, or other similar programs, informs members of an affinity group which other members of the group are currently logged into the server.

All these technologies support, to some degree, the desire of members of an affinity group to stay in close contact. The Internet chat room approach of informing the user which affinity group members are on-line is particularly useful. However, this approach has limitations, the most serious of which is that the user must be logged onto the Internet and in contact with a particular server to receive information on the status of the other group members. For example, suppose a first group member would like to chat with a second group member. The first group member has no way of knowing whether the second group member is logged onto the chat server without first logging onto the server supporting the affinity group. This typically requires connection through a personal computer over a wire-based phone line. Even in situations where wireless modems are used, the majority of the members of the affinity group are tied to terrestrial phone lines.

The assignee of the present invention has heretofore developed a system and method associated with a wireless communication network, described in application Ser. No. 09/514,657, entitled METHOD FOR FACILITATING ELECTRONIC COMMUNICATION, filed Feb. 29, 2000 by Anders Waesterlid, which is hereby incorporated by reference, that supports wirelessly networked affinity groups. While that invention provides wireless affinity groups, along with some location information about the relative whereabouts of members of the affinity group, that invention still leaves unsatisfied customer demands. It is also desired that consumers of the affinity group service be able to query for the location of other members in the affinity group in the event that the member has not provided a timely update of his or her location. Further, there is a need for situational alarms that may be generated based on the proximity of other members of the affinity group, the sensed location of a specific member of the affinity group, or other user defined situations as needed or desired.

SUMMARY OF THE INVENTION

The shortcomings of the prior art are addressed by providing a mobile terminal having software stored in local memory to enable additional functionality within an affinity group. In one embodiment, the software is adapted to function with a location detector, such as a Global Positioning System (GPS) receiver, and to extract therefrom data relating to the present location of the mobile terminal. When a first member in the affinity group wishes to know the location of a remote member of the affinity group, the first member instructs his or her mobile terminal to inquire as to the present location of the remote member. Through a Short Message Service or other comparable messaging technology, an inquiry is sent to the remote member's mobile terminal.

In a first aspect of the invention, members of the affinity group are able to create location place-name descriptions such that commonly visited places have a name or common appellation attached thereto. When the location detector senses that the mobile terminal is within a predefined distance of a location associated with a location place-name description, the mobile terminal assumes that the member is within the confines of that location. Thus, when an inquiry is made as to the location of a remote member, the inquiring member may be informed with the location place-name description rather than a set of raw geocoordinates such as are returned by a GPS receiver. This facilitates comprehension by the inquiring member as to the actual location of the remote member, whereas longitude and latitude measurements corresponding to the raw geocoordinates would perhaps not be particularly insightful.

Location place-name descriptions may be shared amongst members of the affinity group or maintained privately by the original member who created the location place-name description. Further, if a member of the affinity group is not within a predefined location having a location place-name description, a last known location, a vector referencing a known location having a location place-name description, or other indicia of present location may be provided to the inquiring member. While not as useful as the location place-name descriptions, these alternative location indicia may help inform the requesting member of the present location or the destination of the remote member whose location is sought.

In a second aspect of the invention, members of the affinity group may program the mobile terminal to generate situational alarms. Such situational alarms may enable members of the affinity group to know when other members of the affinity group have reached a certain location, such as the mall, or when members of the affinity group are approaching. Once the predefined condition is met, the inquiring or programming member is alerted through an audible signal, a mechanical signal such as a vibration, or other appropriate means. Having been alerted to the existence of the predefined condition, the programming member may then take appropriate action as originally contemplated when the situational alarm was programmed.

DETAILED DESCRIPTION OF THE PREFERRED EMBODIMENTS

The present invention preferably implements additional functionality in a mobile terminal. Specifically, members of affinity groups may now have a device and technique for determining the location of other members of the affinity group. Likewise, members of the affinity group may be alerted when certain user-defined events occur. While particularly well suited for cellular phones, other mobile terminals such as pagers, personal digital assistants, or the like may also be adapted for use with the present invention. Regardless of the particular device used with the present invention, a review of the elements of a wireless communications system and a mobile terminal will be helpful. A typical wireless communication system could be a system that complies with TIA/EIA-136, the GSM standard, or other well-defined standards. This list is provided as an example and is not intended to be a limiting example.

Figure 1:
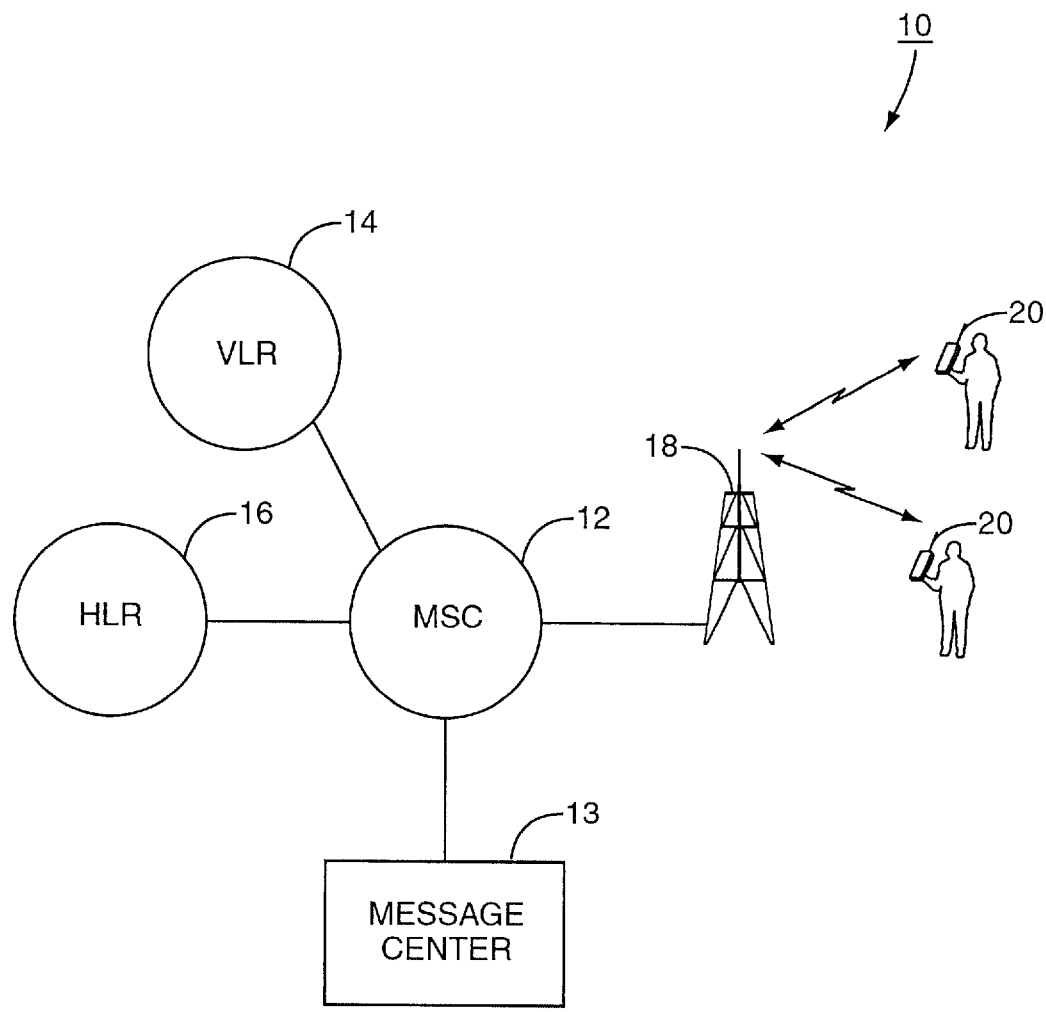
FIG. 1 is schematic diagram of a wireless communications system.

Turning now to the drawings, and particularly to FIG. 1, a wireless communications system 10 is shown in simplified form. Wireless communications system 10 includes a Mobile Services Switching Center (MSC) 12, a Visitor Location Register (VLR) 14, a Home Location Register (HLR) 16, a base station 18, and a plurality of mobile terminals 20 wielded by consumers who may or may not be members of an affinity group. It should be appreciated that the wireless communications system 10 may comprise a plurality of cells (only one shown). Each cell is served by a base station, such as the base station 18 that provides wireless coverage to the mobile terminals 20 within that particular cell. Base station 18 is communicatively connected to the MSC 12. Typically, the wireless communications network 10 includes many MSCs 12. At least one MSC 12 is typically connected via a gateway to the Public Switched Telephone Network (PSTN, not shown). Some MSCs 12 also serve as gateways connecting the network 10 with other wireless networks. The function of the MSCs 12 is to route calls and signals in the network 10 to the appropriate destination. For example, the MSC 12 is responsible for connecting calls to the appropriate base station 18 or to the PSTN or other connected network via a gateway.

To perform its call routing function, the MSC 12 must know the location of the mobile terminals 20 in the Public Land Mobile Network (PLMN) so that calls can be forwarded to the appropriate base station 18. Information concerning the general whereabouts of each mobile terminal 20 is stored in databases that are centrally located in the network 10. Each service provider will typically maintain its own database containing subscriber information which is shared with other networks in the PLMN. These databases include the HLR 16 and the VLR 14.

HLR 16 is used to store information concerning subscribers to a cellular network. This information typically includes the user's name and address for billing purposes, the serial number of the user's mobile terminal 20, and the services to which the user is entitled to receive. In addition, the current general location in the form of a current network ID of the subscriber is stored in the HLR 16 for retrieval by an MSC 12 to use in routing calls to the subscriber. It should be appreciated that the general location stored in the HLR 16 is limited to approximate geographic region or cell, and is not specific enough to identify street addresses or the like. Mobile terminal 20 registers with the servicing MSC 12 when it is powered on and at periodic intervals so that the servicing MSC 12 can keep track of the location of the mobile terminal 20. The mobile terminal 20 also registers when it travels between two different service areas (areas served by different MSCs 12). As part of this registration procedure, the mobile terminal 20 transmits its Mobile Identification Number (MIN) to the MSC 12. MSC 12 uses the MIN to determine which HLR 16 to access. When the mobile terminal 20 registers with MSC 12, the servicing MSC 12 updates the HLR 16 with the current location of the mobile terminal 20. When an MSC 12 receives a call addressed to a subscriber that is not currently in that MSC's service area, the MSC 12 will query the HLR 16 for the subscriber's location so that the call can be forwarded to the MSC 12 currently servicing the subscriber.

VLR 14 is used to store information about users that are not in their home service area. When subscribers roam outside of their home service area, the VLR 14 in the area being visited must keep track of the subscriber's location and be able to verify the Mobile Identification Number (MIN) of the mobile terminal 20. VLR 14 in the area being visited queries the HLR 16 in the subscriber's home service area to authenticate the subscriber and determine the services to which the subscriber is entitled. Information concerning the user is stored in the VLR 14 as long as the subscriber remains in the service area. VLR 14 also stores the current general location of the subscriber. The subscriber's current location is also communicated back to the home HLR 16 so that the home network 10 will know how to forward calls addressed to the subscriber who is currently outside of the home network 10.

Many wireless communications networks 10 implement a service called short message service (SMS). This service allows mobile users to send and receive short text messages. Messages originating from, or terminating at, a mobile terminal 20 in the network 10 are stored in a message center 13 connected to an MSC 12. Message center 13 is a store-and-forward device or system that is used to support teleservices like cellular messaging. The typical interfaces to the message center 13 allow direct dial-in access, computer interface for e-mail delivery to phones, or human operator input for paging services. Mobile-originated SMS messages are initially forwarded to the MSC 12 servicing the addressed mobile terminal 20 and routed by the MSC 12 to the message service center 13 where the SMS message is stored. MSC 12 searches for the targeted mobile terminal 20 and alerts the mobile terminal 20 that a message is coming. Targeted mobile terminal 20 tunes to a designated messaging channel (typically an SDCCH channel) where it waits for the SMS message. MSC 12 then forwards the SMS message to the mobile terminal 20 on the designated channel and waits for an acknowledgement from the mobile terminal 20 confirming receipt of the message. If an acknowledgement is received from the mobile terminal 20, the message is removed from storage. If receipt of the message is not acknowledged, the MSC 12 may attempt to deliver the message again. It is disclosed in the previously incorporated application entitled METHOD FOR FACILITATING ELECTRONIC COMMUNICATION that the message center 13 or other server may act in a supporting role for the affinity groups of the present invention.

Additionally, some networks 10, and especially networks that are adapted to support the present invention, may include a Mobile Positioning Center (MPC) that serves as the point of interface of the wireless network 10 for the exchange of geographic position information. An MPC may control multiple Position Determining Entities (PDEs). A PDE is the network entity that manages the position or geographic location determination of the mobile terminal 20. For further information about such entities, reference is made to Enhanced Wireless 9-1-1 Phase 2, TR-45.2, AHES (PN-3890, Rev. 11, Jan. 13, 2000). This published standard is well understood by those in the industry and is incorporated by reference.

Figure 2:
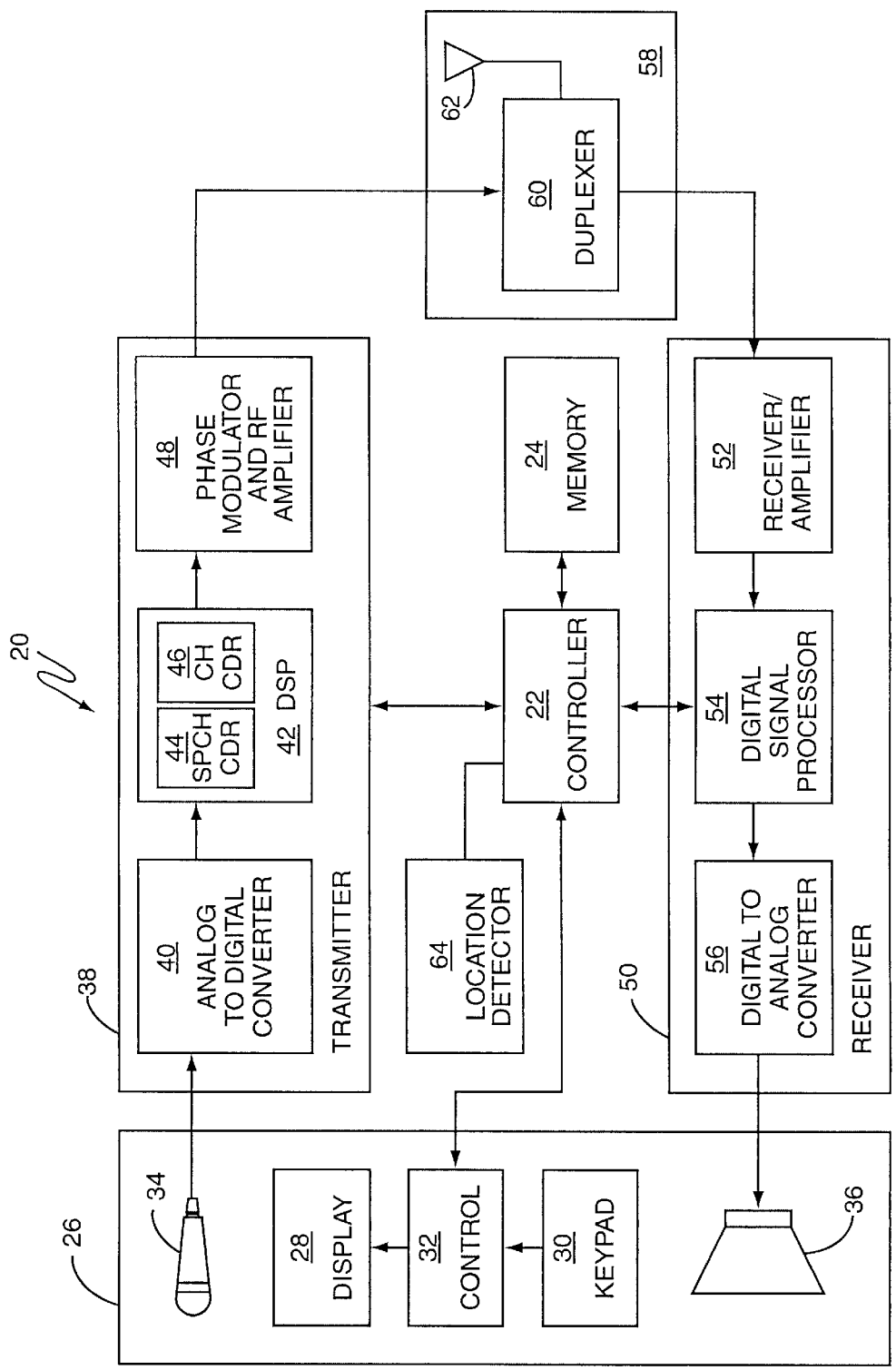
FIG. 2 is a schematic diagram of a mobile terminal.

Turning now to FIG. 2, the mobile terminal 20 typically includes a controller 22, an operator interface 26, a transmitter 38, a receiver 50, and an antenna assembly 58. The operator interface 26 typically includes a display 28, keypad 30, interface control 32, microphone 34, and a speaker 36. The display 28 allows the operator to see dialed digits, call status, and other service information. The keypad 30 allows the operator to dial numbers, enter commands, and select options. Interface control 32 interfaces the display 28 and keypad 30 with the controller 22. The microphone 34 receives acoustic signals from the user and converts the acoustic signals to an analog electrical signal. The speaker 36 converts analog electrical signals from the receiver 50 to acoustic signals which can be heard by the user.

The analog electrical signal from the microphone 34 is supplied to the transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42, which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48, which are shown as a combined unit in FIG. 2. The modulator converts the signal to a form which is suitable for transmission on an RF carrier. The RF amplifier 48 then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52, which shifts the frequency spectrum, and boosts the low-level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data are passed to the controller 22. Speech data is processed by a speech decoder and passed to the digital to analog converter 56. The digital signal processor 54, may include, or may work in conjunction with, a DTMF tone detector (not shown). The digital to analog converter 56 converts the speech data into an analog signal which is applied to the speaker 36 to generate acoustic signals which can be heard by the user.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62.

The controller 22 coordinates the operation of the transmitter 38 and the receiver 50, and may for instance take the form of a typical microprocessor. This microprocessor may be a dedicated or shared microprocessor and may be a single processor or multiple parallel processors as needed or desired. This coordination includes power control, channel selection, timing, as well as a host of other functions known in the art. The controller 22 inserts signaling messages into the transmitted signals and extracts signaling messages from the received signals. The controller 22 responds to any base station commands contained in the signaling messages, and implements those commands. When the user enters commands via the keypad 30, the commands are transferred to the controller 22 for action. Memory 24 stores and supplies information at the direction of the controller 22 and preferably includes both volatile and non-volatile portions.

In addition to the above described elements, the mobile terminal 20 preferably also includes a location detector 64 in communication with the controller 22. Location detector 64 may have its own antenna (not shown) or may share the antenna 62. Location detector 64 may be Global Positioning System (GPS), an Observed Time Difference system (OTD—where the mobile terminal 20 computes position using observed timing of bursts from multiple base stations 18), a Time of Arrival system (TOA—where the network 10 computes position using mobile terminal bursts observed by multiple base stations 18), or other satellite or terrestrial systems as needed or desired, e.g. inertial systems. Typically, the location detector 64 will output a geocoordinate expressed as a longitude and latitude coordinates corresponding to the present location of the mobile terminal 20.

In the event that the location detector 64 is not able to provide a sensed geocoordinate through its normal position determining network, it is possible that the network 10 may provide to the mobile terminal 20 and particularly to the location detector 64, at least a cell location within the network. Further, with the use of a technique called "timing advance," a radius from a particular base station 18 may be determined. Thus, if the location detector 64 was not operational, the network 10 could at least provide some location information about the location of the mobile terminal 20, such as within two miles of the base station 18 at Broadway and Main Streets. While not as helpful as the location place-name descriptions of the present invention, this information may still be helpful to members of the affinity group.

The present invention may be implemented through software stored in memory 24 or specific hardware components may be implemented within controller 22 to perform the functions discussed below.

The application entitled METHOD FOR FACILITATING ELECTRONIC COMMUNICATION defines affinity groups and provides a number of different embodiments of how an affinity group may function. Specifically, affinity groups may share information using a server based approach, or a peer-to-peer approach. Members receive updated information automatically when they turn on their mobile terminals 20, or periodically as part of a camping routine. In particular, when a user provides an update to their reported location, the server may distribute the information, or the updating user's mobile terminal 20 may contact each other active member of the affinity group. One key shortcoming of the prior invention was the fact that users may not provide timely updates about their location, or users may provide erroneous location information through carelessness or intention. This reliance on fallible human remembrance to update location information prevents exploring some aspects of the utility of wireless based affinity groups. Further, in that invention, there is no provision for queries or independent verification of the current location of a remote affinity group member.

While the application entitled METHOD FOR FACILITATING ELECTRONIC COMMUNICATION contemplates Short Message Service (SMS) as the preferred technique by which members of an affinity group could communicate, there are other techniques that may be equally applicable including data messages, GPRS (GSM Packet Radio Service), e-mails, USSD, and the like. In certain geographically proximate locations, Bluetooth (a short range terminal to terminal communication technique) or other comparable technologies may be used. Regardless of the technique used to communicate amongst members of the affinity group, there remain functions that are not addressed in the Waesterlid application.

Commonly owned patent application Ser. No. 09/097,941, entitled IMPROVED METHOD AND APPARATUS FOR LOCATING A WIRELESS COMMUNICATION DEVICE, which is hereby incorporated by reference, provides a technique by which a mobile terminal 20 may be combined with a location detector 64 and further programmed to recognize certain default locations. Specifically, that application contemplates a user defining a home or other default location by its geocoordinates and, when the location detector 64 returns sensed geocoordinates within a predetermined distance of these predefined geocoordinates, the mobile terminal 20 reports that the mobile terminal 20 is at the default location. This simplifies location reporting to the extent that an address or common appellation is reported rather than merely a latitude and longitude. This technique may be used and expanded upon in the present invention.

Alternative techniques to link a common descriptor or address to sensed geocoordinates may also be used if needed or desired. Words or phrases to describe such predefined locations will be defined herein as "location place-name descriptions." Additionally, some mobile terminals have the ability to transfer images or video clips. Thus, location place-name description is also defined herein to include such images, such videos, or even a short audio phrase that may describe the location.

Additionally, there need not be a specific point that is associated with a location place-name description, but rather a polygon of a predetermined number of points could define a location having a location place-name description. For example, the four corners of the mall may define such a polygon. Then if the sensed geocoordinates of the mobile terminal 20 were within the defined polygon, or within a predetermined distance from an edge of the polygon, then the mobile terminal 20 would be reported as being located within the polygon and thus within the designated location. These polygons may be regular or nonuniform as needed or desired.

Still further, there members of the affinity group need not define all the location place-name descriptions used by the affinity group. Rather, it is possible that the service provider could provide a set of predefined locations having location place-name descriptions. Thus, the service provider could predefine the mall, the park, and the university library for example, and let the members of the affinity group define other desired locations.

The process of assessing location may be continuous or may be accessed at discrete instances based on user requests as detailed more fully below. It is imagined that there will be many places for which there are no location place-name descriptions. In these instances, the location detector 64 may generate raw sensed geocoordinates, or the mobile terminal 20 may store the last known location place-name description. Alternatively, vectors indicating travel direction and velocity may be generated that could be linked to the last known location place-name description. For example, "left home six minutes ago, heading SW at 35 mph" could be a valid reported location. Alternatively, just a vector to a known location place-name description could be provided such as "3 km southeast of the mall." These vectors referencing known location place-name descriptions are helpful in providing some user friendly information about the whereabouts of members of the affinity group. Further, even when the location detector 64 was not operational, the network 10 could provide cell location or some other rough positional estimate.

Figure 3:
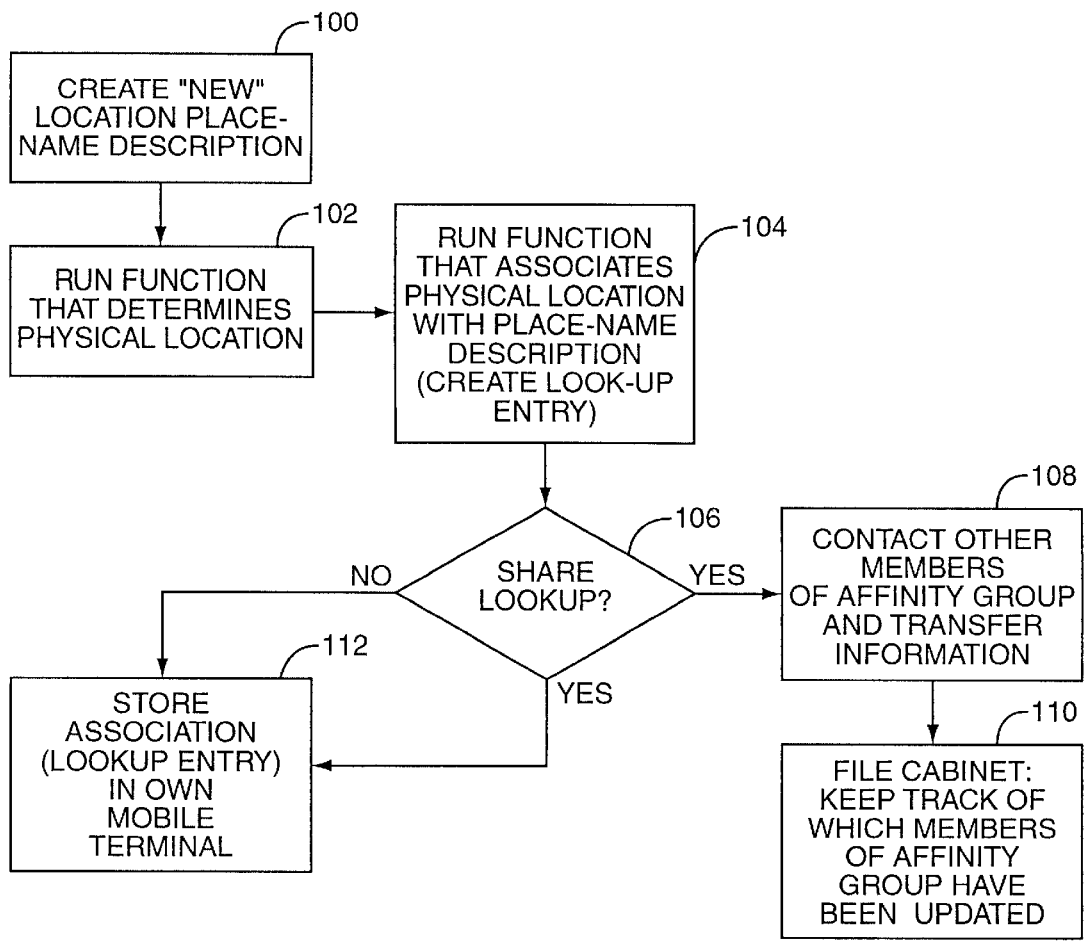
FIG. 3 is a flow chart of the methodology for creating and sharing translation tags for use in the present invention.

To maximize the utility of the present invention, the location place-name descriptions should be shared amongst the affinity group such that other members of the affinity group may recognize when members are within one of the predefined locations. An exemplary technique to share such location place-name descriptions is shown in FIG. 3, wherein an individual user triggers a command on the mobile terminal 20 that creates a new location place-name description (block 100). This may be done through manual entry through the keypad 30, voice activation through the microphone 34, uploading from a personal computer (not shown) communicatively connected to the mobile terminal 20, or other technique as needed or desired. Mobile terminal 20 runs a function that determines the geocoordinates of the mobile terminal 20 corresponding to the location place-name description (block 102). This may be done through positioning the mobile terminal 20 at the desired location prior to running the routine, through manual entry of geocoordinates corresponding to the location to be defined, or the like. The geocoordinates are then associated with the location place-name description (block 104). This may be done with a look up table or the like as needed or desired. The user may then be prompted to share the location place-name description (block 106). If the user chooses to share the location place-name description with the other members of the affinity group, the mobile terminal 20 contacts other members of the affinity group and transfers the information thereto (block 108). There may be subgroups within the affinity group, and the location place-name description only shared amongst certain subgroups. As detailed in the application entitled METHOD FOR FACILITATING ELECTRONIC COMMUNICATION, there are a number of ways that updates about the status of members of the affinity group may be managed between members of the affinity group, including a server based system or a peer-to-peer based system. Regardless of the method, something must keep track of which members of the affinity group have been updated (block 110) so that individuals who have not received the update, do receive the update in due course. This process lets everyone within the affinity group know that certain geocoordinates correspond to certain predefined locations. Also, regardless of whether the update is shared, the individual who created the location place-name description should store the location place-name description in their own mobile terminal 20 (block 112).

Figure 4:
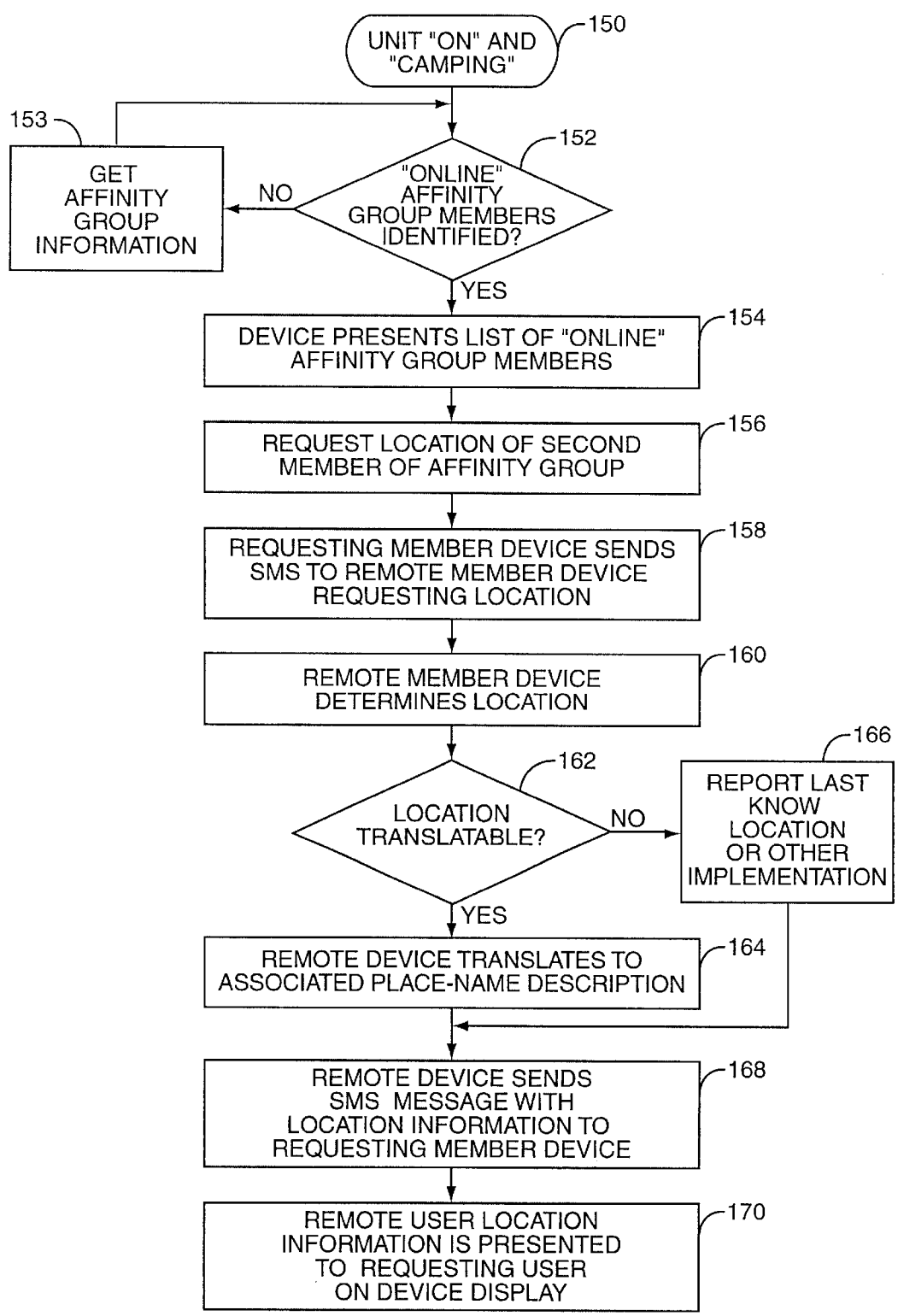
FIG. 4 is a flow chart of the methodology behind a first aspect of the invention.

Armed with these shared location place-name descriptions, a first aspect of the present invention may be invoked as shown in a flow chart format in FIG. 4. While it is possible that affinity group updates, inquiries, and responses could function while the mobile terminal 20 was actively engaged in other communication activities, it is preferred that the mobile terminal 20 be on and in an idle state (block 150). This on and idle state is frequently referred to as "camping" in the art. Mobile terminal 20 then determines if the active or online affinity group members have been identified (block 152). "Online" as used herein refers to the condition in which these users are "on" and camped and able to receive pages and communicate with members of the affinity group. If the answer is no, they have not been identified, the mobile terminal 20 gets affinity group information as discussed in the previously incorporated application entitled METHOD FOR FACILITATING ELECTRONIC COMMUNICATION (block 153). If the answer is yes, the members have been identified, the mobile terminal 20 presents a list of active or online affinity group members (block 154) through the display 26, audibly through the speaker 36, or through other techniques as needed or desired. At some point, an affinity group member may request the location of another affinity group member (referred to hereinafter as the "remote member") (block 156). This request may take the form of selecting a command from a pull down menu, clicking on a hypertext link, selecting an icon which invokes the function, or other comparable technique as needed or desired by the operating system employed by the controller 22. In the preferred embodiment, addressing information is stored in memory 24 for each member of the affinity group. The requesting user's mobile terminal 20 preferably sends a SMS, or equivalent communication technique, message to the mobile terminal 20 of the remote member (block 158) with a request to provide the present location of the remote member.

The mobile terminal 20 of the remote member invokes the location detector 64 and determines the present location of the remote member or at least the present location of the remote member's mobile terminal 20 (block 160) as there may be occasions when the mobile terminal 20 has been left "on" but is not in the possession of the remote member. Initially, the location detector 64 of the remote member's mobile terminal 20 will return sensed geocoordinates. The remote member's mobile terminal 20 determines if the sensed geocoordinates are translatable into a location place-name description (block 162). If the answer is yes, the sensed geocoordinates are translatable into a location place-name description, the remote member's mobile terminal 20 translates the sensed geocoordinates to the predefined location place-name description (block 164). If the answer is no, there is no translation available, the remote member's mobile terminal 20 may report a last known translatable location, raw sensed geocoordinates, a vector from the last known location, a vector referencing a known location, or other identifying information that enlightens the requesting member as to the present location of the remote member (block 166). Additionally, if no geocoordinates may be sensed because of a failure of the location detector 64 or service outage for a particular location or the like, the network 10 could still report the cell location of the mobile terminal 20. This rough positional reporting to members of the affinity group upon request is heretofore unknown in the art.

The remote member's mobile terminal 20 sends a SMS, or other equivalent message with the location information to the requesting member's mobile terminal 20 (block 168). The requesting member's mobile terminal 20 then presents the location information to the requesting member (block 170) through the display 28, audibly through the speaker 36, or other technique. Thus, this sharing lets members of the affinity group know where other members of the affinity group are located.

Note that there are a number of variations on this technique that are considered to be within the scope of the present invention. In particular, the precise order of events need not strictly follow the flow chart presented, but could reflect the nonlinearity found in most human driven decisional logic. Further, translation of the sensed geocoordinates of the remote member's mobile terminal 20 may occur at the remote member's mobile terminal 20 as previously described, at a server associated with the affinity group, or at the requesting member's mobile terminal 20. In all cases, the translation may be done by a look up table or other comparable function to determine if the sensed geocoordinates are within a predetermined distance from the predefined geocoordinates associated with a location place-name description.

Note also that there may be implementations of the present invention wherein codes associated with location place-name descriptions are transmitted instead of either geocoordinates or actual location place-name descriptions. These codes may be a shorthand notation for the location place-name description. That is, Bob's House may be BH. Additionally, they may be indecipherable machine processable data that may be translated such that the end result is displaying a meaningful representation of the location of the remote member to the requesting member. The particular data transmitted to enable the requesting user to understand is not intended to limit the scope of the present invention. Further, the location place-name description could be an image, a video clip, an audio clip, or the like.

Also, there may be occasions when users do not wish to share their present location with members of the affinity group or with particular subgroups within the affinity group. Thus, any particular mobile terminal 20 may operate in one of at least four modes. A first mode automatically shares location information with requesting members of the affinity group. A second mode automatically declines to share location information with requesting members of the affinity group. A third mode prompts the remote member to share upon receipt of a request from another member. Thus, in the third mode, the remote member may share with a first member of the affinity group, but not with a second member of the affinity group. In a fourth mode, certain predefined members may automatically be provided with location information, but others would be denied such automatic information and may generate a prompt or automatically be denied such information. The remote member would enter the appropriate commands to predefine authorized interrogators as needed or desired. Other modes may also be implemented as needed or desired by members of the affinity group.

Further, instead of attempting to provide the current location of the remote member as raw geocoordinates, a last known location could be displayed, and then updated when the remote member reaches another location having a location place-name description. Additionally, if a remote member is "offline," the requesting member's mobile terminal 20 may store the request and periodically make the request until such time as the remote member comes online. Or an alarm may be generated when the remote member comes online so that the request may be resubmitted manually by the requesting member.

Still further, when the remote member is between known location place-name descriptions, and a last known or equivalent message is generated, it may be desirable to include a time stamp to facilitate comprehension of where the remote member may be likely to be found. Or as noted above, a simple cell location could be provided with or without time advance positioning information.

Figure 5:
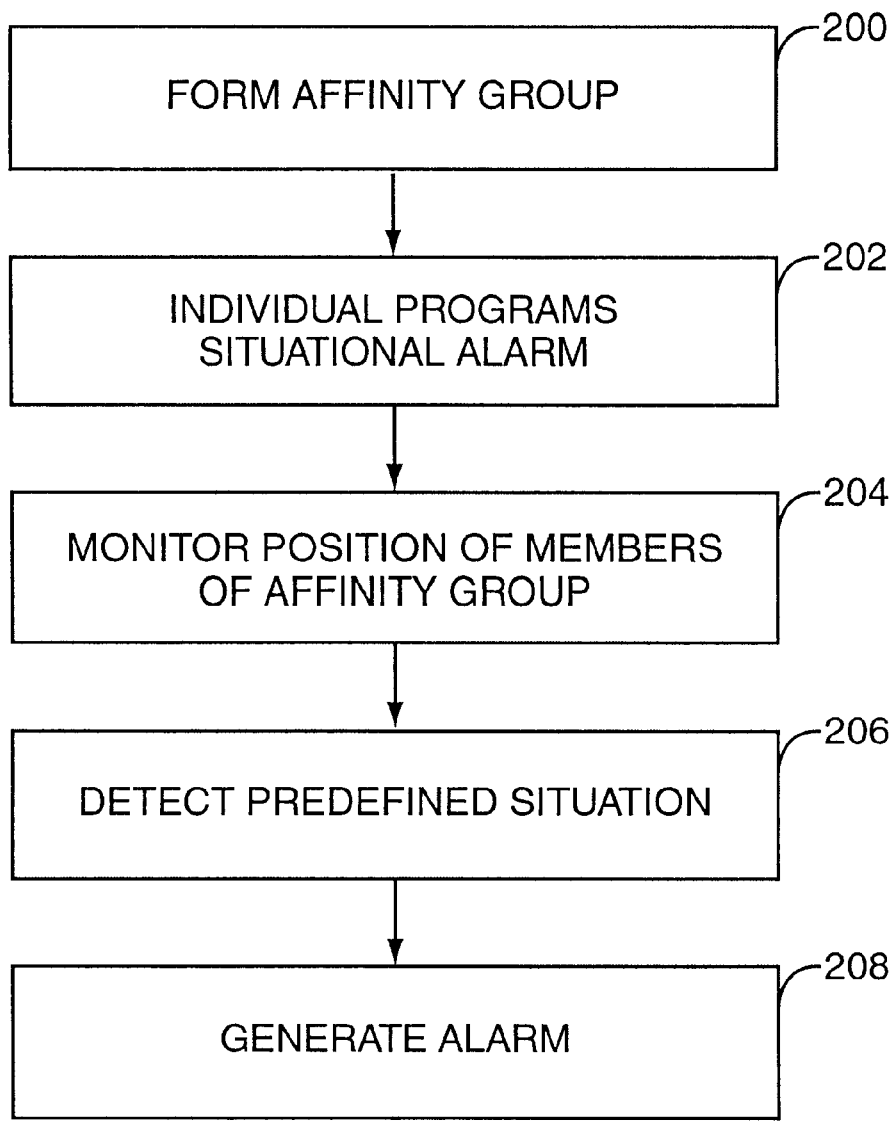
FIG. 5 is a flow chart of the methodology behind a second aspect of the invention.

A second aspect of the present invention is seen in FIG. 5 that includes situational alarms that users may program. The situations are based on the reported locations of the mobile terminals 20 used by members of the affinity group. Note that situational alarms could also be generated based on locations reported by the members of the affinity group rather than the sensed location previously described. Initially, users must form an affinity group (block 200). Subsequently, a user may program a situational alarm (block 202). The variations on this are limitless. Some individuals may wish to know when two particular members of the affinity group are at the mall. Others may want to know when any two members of the affinity group are within a city block of one another. Others may want to know when any affinity group member is approaching the present location of the programmer. For example, Jack could configure his device to alert him when Jill and Susie have both reached the vicinity of the mall, or when both of these women are located at Jill's house. These alarms may be programmed for the purpose of facilitating a meeting, avoiding a meeting, determining when would be a good time to drop an item off, have a study session, and the like. In a server based affinity group, the server could monitor the positions of members of the affinity group (block 204). In a peer to peer based affinity group the alarm programmer's mobile terminal 20 may periodically monitor the location of other members of the affinity group. Regardless of the device that performs the monitoring, presumably, eventually, the monitoring device will detect the predefined situation (block 206) and generate an alarm at the programmer's mobile terminal 20 (block 208). This may be accomplished through an audio display, a mechanical display such as vibrating, a visual display such as a flashing light, or the like. The user may have to inquire further which situation has occurred through calling up the alarm function on the mobile terminal 20, or the alarms may be programmed to differentiate from one another. For example, one ring if they approach by land; two rings if they approach by sea.

With the second aspect of the invention, many eventualities may be realized, especially for people on the go who have difficulty catching up with one another. Both aspects of the present invention provide improvements over the simple affinity groups presented in the previously incorporated application entitled METHOD FOR FACILITATING ELECTRONIC COMMUNICATION.

The present invention may, of course, be carried out in other specific ways than those herein set forth without departing from the spirit and essential characteristics of the invention. The present embodiments are, therefore, to be considered in all respects as illustrative and not restrictive, and all changed coming within the meaning and equivalency range of the appended claims are intended to be embraced therein.

What is claimed is:

1. A method of determining a location of a remote member of an affinity group, said remote member having a remote mobile terminal associated therewith, said method comprising:

initiating a query at a first mobile terminal as to the location presently associated with the remote member of the affinity group; and responding to said query at the remote mobile terminal by:

sensing, with said remote mobile terminal, the location presently associated with the remote member; and providing a location-place name description to the first mobile terminal, wherein said location-place name description is provided by the remote terminal and corresponds to the location presently associated with the remote member of the affinity group.

2. The method of claim 1 wherein initiating a query at a first mobile terminal comprises initiating a query as to locations presently associated with a plurality of members of the affinity group.

3. The method of claim 2 further comprising receiving the query at different remote mobile terminals, each of said different remote terminals associated with different ones of said plurality of members of the affinity group.

4. The method of claim 1 wherein providing said location-place name description comprises providing a last known location place-name description associated with said remote member.

5. The method of claim 4 wherein providing indicia comprises providing a last known location place-name description associated with said remote member.

6. The method of claim 1 wherein providing said location-place name description comprises providing a vector referencing a location place-name description.

7. A plurality of mobile terminals adapted to facilitate communication amongst members of an affinity group, said mobile terminals comprising:

a transceiver in a first mobile terminal for wireless communication between said first mobile terminal associated with a first member of the affinity group and a second member of the affinity group;

a location detector for sensing geocoordinates corresponding to a present location of said first mobile terminal, said location detector activated in response to a query from said second member of the affinity group; and a controller operatively connected to said transceiver and said location detector for communicating a location-place name description through said transceiver in said first mobile terminal, to said second member of the affinity group in response to a query from said second member, said location-place name description related to the present location of said first mobile terminal.

8. The mobile terminal of claim 7 wherein said location-place name description comprises a last known location place-name description associated with said second member.

9. The mobile terminal of claim 7 wherein said location-place name description comprises a vector referencing a known location place-name description.

* * * * *